United States Patent [19]
Gold et al.

[11] Patent Number: 5,428,543
[45] Date of Patent: Jun. 27, 1995

[54] VERTICAL CONTROL SYSTEM FOR ROTARY WING AIRCRAFT

[75] Inventors: Phillip J. Gold, Shelton; Lorren Stiles, Roxbury, both of Conn.; Joseph A. Post, Burke, Va.

[73] Assignee: United Technologies Corporation, Hartford, Conn.

[21] Appl. No.: 271,221

[22] Filed: Jul. 6, 1994

Related U.S. Application Data

[63] Continuation of Ser. No. 751,435, Aug. 28, 1991, abandoned.

[51] Int. Cl.$^6$ ............................................. B64D 19/00
[52] U.S. Cl. ............................. 364/433; 244/17.13; 244/177; 364/434
[58] Field of Search .................... 244/17.13, 223, 177, 244/236, 234; 364/433, 434, 424, 424.01; 235/150.26

[56] References Cited

U.S. PATENT DOCUMENTS

| | | | |
|---|---|---|---|
| 3,927,306 | 12/1975 | Miller | 235/150.22 |
| 4,005,835 | 2/1977 | Gerstine et al. | 244/17.13 |
| 4,012,626 | 3/1977 | Miller et al. | 235/150.26 |
| 4,313,165 | 1/1982 | Clelford et al. | 364/424 |
| 4,382,283 | 5/1983 | Clelford et al. | 364/434 |
| 4,420,808 | 12/1983 | Diamond et al. | 364/434 |
| 4,645,141 | 2/1987 | McElreath | 244/17.13 |
| 4,696,445 | 9/1987 | Wright et al. | 244/229 |
| 4,924,400 | 5/1990 | Post et al. | 364/433 |
| 5,001,646 | 3/1991 | Caldwell et al. | 364/434 |
| 5,076,517 | 12/1991 | Ferranti et al. | 244/228 |
| 5,117,362 | 5/1992 | Peckham et al. | 364/433 |
| 5,156,363 | 10/1992 | Cizewski et al. | 244/223 |
| 5,224,664 | 7/1993 | Adams, Sr. et al. | 244/17.13 |

OTHER PUBLICATIONS

Fink, Donald G., *Electronics Engineers' Handbook*, McGraw-Hill Book Co. New York, 1982, pp. 17-52 to 17-53, Second Edition.

*Primary Examiner*—Kevin J. Teska
*Assistant Examiner*—Stephen J. Walder, Jr.
*Attorney, Agent, or Firm*—M. P. Williams

[57] ABSTRACT

A vertical control system for a rotary winged aircraft receives inputs from a displacement collective stick and a sidearm controller. The system provides a set point for the vertical rate of change of the helicopter as a function of a vertical lift command signal from the sidearm controller. The set point is used as a reference for an altitude rate of change feedback path, and an integrated value of the set point is used for an altitude feedback path. The set point is also input to a feedforward control path having an inverse vehicle model to provide a command signal indicative of the command for aircraft collective pitch necessary to achieve the desired set point. Signals from all three paths (i.e., the altitude rate of change feedback path, the altitude feedback path, and the feedforward path) are summed to provide a signal to backdrive the displacement collective which controls main rotor collective pitch.

14 Claims, 5 Drawing Sheets

VERTICAL CONTROL SYSTEM FOR ROTARY WING AIRCRAFT

This is a continuation of application of Ser. No. 07/751,435, filed Aug. 28, 1991, now abandoned.

TECHNICAL FIELD

This invention relates to rotary winged aircraft flight control systems, and more particularly to those flight control systems employing a sidearm multi-axis control stick and a displacement collective stick to control collective pitch of the aircraft.

Background Art

Mechanical linkage flight control systems for rotary winged aircraft, such as helicopters, employ: a cyclic stick for commanding the aircraft's pitch and roll, pedals for commanding directional yaw, and a pivotable collective stick for lift control. These systems require significant pilot workload to manually control aircraft altitude. The more recent fly-by-wire control systems (see for example U.S. Pat. No. 4,420,808 to Diamond et al and assigned to the assignee of the present invention) use a single four axis sidearm controller to command all four (pitch, roll, yaw and collective/lift) axes of the aircraft.

The sidearm controller is a limited displacement "force stick" in which the pilot command is actuated by applied stick force rather than stick displacement as in the pivotal collective stick. However, the sidearm controller's limited displacement provides little tactile feedback for the pilot. While not a problem for yaw and cyclic maneuvers for which the aircraft has a nearly instantaneous response (little energy is required to bank or yaw the aircraft), it may inhibit pilot perception of the collective axis response (the load on the main rotor). This results from the long time constant characteristics of the collective response. The loss of "stick feel" requires the pilot to rely on secondary cues, such as torque and collective cockpit displays, to monitor aircraft lift. This is an unnecessary pilot distraction during emergency, or nap-of-the earth (NOE) maneuvers.

U.S. Pat. No. 4,696,445 to Wright et al., also of common assignee, overcomes this collective feedback response problem by selectively "breaking out" the collective channel into a "tracking mode" for NOE flights. In the tracking mode the displacement collective stick is cross-coupled to a four axis sidearm controller, and means are provided to alternately fade the collective channel authority of each device in dependence on the position command issued by the other device. In the tracking mode the displacement stick is motor driven by an actuator to track the force input to the sidearm controller. The pilot may alternate command inputs through either device; for NOE maneuvers he may choose the displacement stick (for tactile feedback) whereas in non-NOE flight he may use the force stick.

There are, however, two distinct shortcomings of the Wright et al system. The first problem is the increased pilot workload associated with alternate use of two stick devices when piloting high speed aircraft. The second problem is the inability of the system to precisely command altitude setting due to the tracking mode characteristics.

Disclosure of the Invention

An object of the present invention is to provide a vertical control system which responds to a vertical command signal from a multi-axis sidearm controller to change the aircraft's altitude by scheduling a set point for the aircraft vertical rate of change.

Another object of the present invention is to use model following control laws within the vertical control system that are responsive to the vertical command signal to precisely control aircraft altitude.

Yet another object of the present invention is to use both the full displacement stick and the side arm controller to selectively provide commands to the vertical control system, where the displacement stick has full-time full authority control of collective pitch and the sidearm controller has a limited authority control over collective pitch.

According to the present invention, a vertical control system for a rotary winged aircraft receives inputs from a displacement collective stick and a multi-axis sidearm controller, and schedules via an aircraft command model a set point for the vertical rate of change of the aircraft as a function of a vertical command signal from the sidearm controller, the set point is used as a reference for an altitude rate of change feedback path reference, and an integrated value of the set point is used for an altitude feedback path, and the set point is also input to a feedforward control path having an inverse vehicle model to provide a command signal indicative of the command for aircraft collective pitch necessary to achieve the desired set point, signals from all three paths are summed to provide a magnitude and rate limited command signal which controls aircraft altitude when the aircraft altitude hold function is engaged by the pilot.

The present invention commands aircraft vertical rate of change in response to force imparted by the pilot in the vertical axis of the sidearm controller, and conditions/shapes the resultant limited authority rate command signal such that the pilot may smoothly transition between using the full time full authority displacement collective stick to control aircraft vertical lift, and the sidearm controller. When the pilot has engaged altitude hold, he can control vertical aircraft rate of change by applying the appropriate force on the sidearm controller, and the displacement collective stick will "track" the force.

These and other objects, features and advantages of the present invention will become more apparent in light of the following detailed description of the best mode embodiment thereof as illustrated in the accompanying drawings.

BEST MODE FOR CARRYING OUT THE INVENTION

Figure 1:
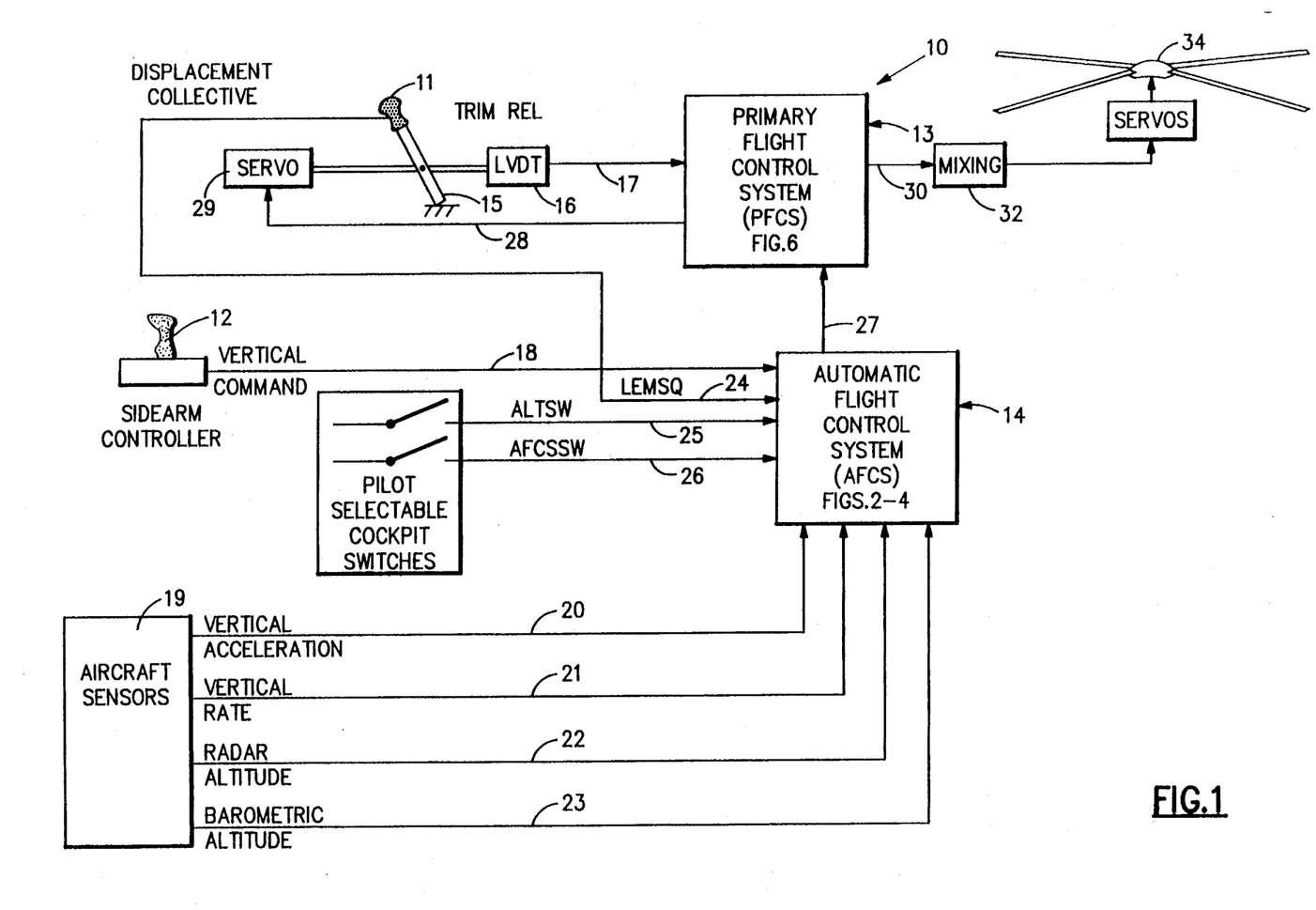
FIG. 1 is a block diagram of a vertical control system having an Automatic Flight Control System (AFCS) and a Primary Flight Control System (PFCS)

In FIG. 1, is illustrated a vertical control system 10 for controlling the lift of a rotary winged aircraft (not shown). Collective inputs are provided to the control system by a displacement stick 11 and a four axis sidearm controller 12. The control system 10 includes a primary flight control system (PFCS) 13 and an automatic flight control system (AFCS) 14.

The displacement stick 11 is typically located to the left of the pilot's seat and pivots about a point 15. The position of the displacement stick is sensed by a linear variable differential transformer (LVDT) 16 which provides an electrical signal indicative of stick position on a line 17 to the PFCS.

The four axis sidearm controller 12 is a multi-axis force type of stick, an example of which is disclosed in Diamond et al. The sidearm controller provides the AFCS a vertical command signal on a line 18, which varies in response to the amount of force the pilot is imparting on the sidearm controller in the vertical axis.

Signals indicative of vertical acceleration, vertical rate, radar altitude, and barometric altitude are sensed by sensors 19 and provided to the AFCS on lines 20-23 respectively. The sensors typically used to provide these signals include barometric and radar altimeters, a vertical rate sensor, and a vertical accelerometer. These signals can be provided to the AFCS by dedicated electrical lines as illustrated, or may be provided to the AFCS via a digital bus (e.g., MIL-STD-1553, ARINC 429 or 629, or RS422). The AFCS computes a collective command signal as a function of the signal on lines 18,20-23, and several pilot selectable discrete signals to be discussed hereinafter on lines 24-26, and provides the command signal to the PFCS on a line 27.

The PFCS provides a drive signal on a line 28 to a servo 29 which moves the displacement stick so it tracks the collective command signal on the line 27, under circumstances (i.e., altitude hold is engaged) to be discussed in detail hereinafter. The PFCS also selects and conditions the signals on the lines 17 and 27, and provides a collective pitch command signal on a line 30 to a mixer 32 which generates a command to a main rotor 34 of the aircraft for controlling the collective pitch of the aircraft.

In the present exemplary embodiment of the invention, the displacement collective control stick 11 provides full time full authority control of the main rotor 34 pitch (i.e., the collective is never disengaged), while the sidearm controller 12 provides a limited authority model following vertical rate command/altitude hold response. The present invention is best understood by discussing the AFCS and the PFCS separately.

AFCS Operation

Figure 2:
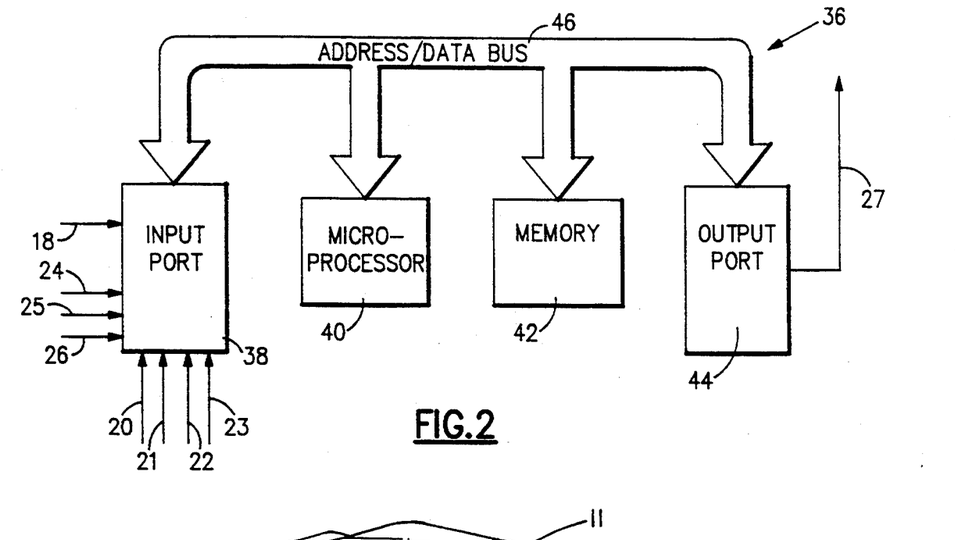
FIG. 2 is a top level block diagram of the digital electronics in the AFCS of FIG. 1.

Referring to FIG. 2, an exemplary embodiment of the AFCS is a microprocessor based electronic control system 36. The input signals on the lines 18, and 20-23 are received by an input port 38 which may include an analog-to-digital converter (not shown), a frequency-to-digital convertor (not shown) or any other signal conditioning required to convert the input signals to digital signals. The AFCS also includes a microprocessor 40 (e.g., Intel 80286, Motorola 68020), memory 42 (e.g., RAM, UVPROM, EEPROM), and an output port 44. The input port, microprocessor, memory and output port are all interconnected by a address/data bus 46 in a manner well known in the art. The output port may comprise a digital-to-analog converter (not shown), a parallel-to-serial convertor (not shown) and a discrete output driver (not shown). The output port provides the collective command signal on the line 27.

Figure 3:
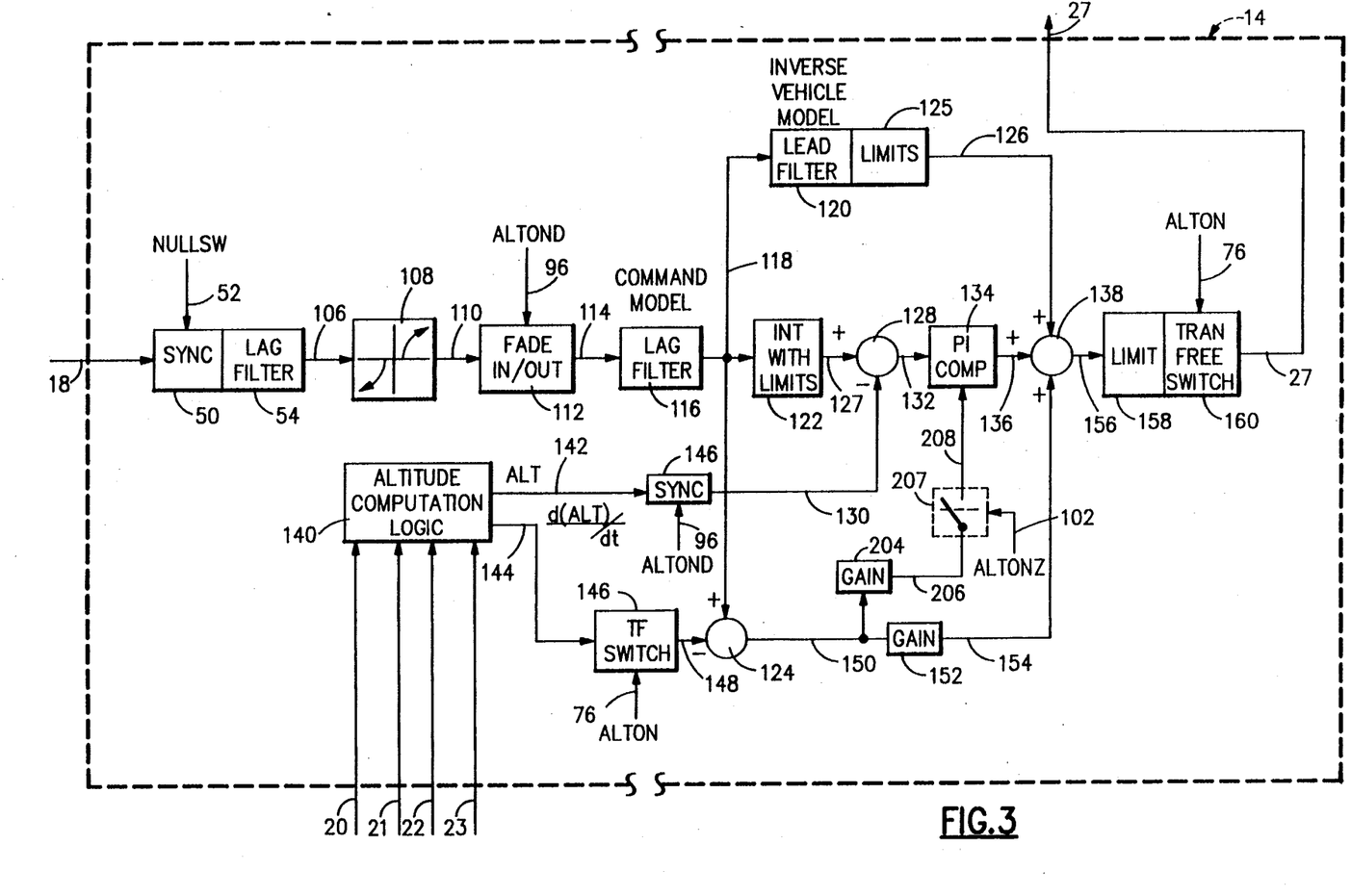
FIG. 3 is a block diagram of a portion of the control logic resident in the AFCS of FIG. 2 for providing a collective command signal responsive to a vertical command from a sidearm controller of FIG. 1.

FIG. 3 illustrates a block diagram of a portion of the control logic resident in the AFCS for providing a collective command signal responsive to the vertical command from a sidearm controller. The control logic is resident in the memory 42, and executable in the microprocessor 40. In the interest of clarity the control logic is illustrated in block diagram form rather than in a flow chart. However, it should be understood that the best mode embodiment of the present invention is a microprocessor based control system where the control logic of FIG. 3, and logic hereinafter are all implemented in software and executable by the microprocessor unless explicitly stated otherwise.

The vertical command signal on the line 18 from the side arm controller is input to a synchronizer 50 to remove any steady state biases. The synchronizer 50 also receives a discrete signal NULLSW on a line 52 which determines when the synchronizer stores the vertical command signal. When NULLSW is set, the vertical command signal currently on the line 18 is stored by the synchronizer. However, when NULLSW is cleared, the difference between the stored vertical command signal and the signal on the line 18 is input to a lag filter 54 to attenuate any high frequency noise.

Figure 4:
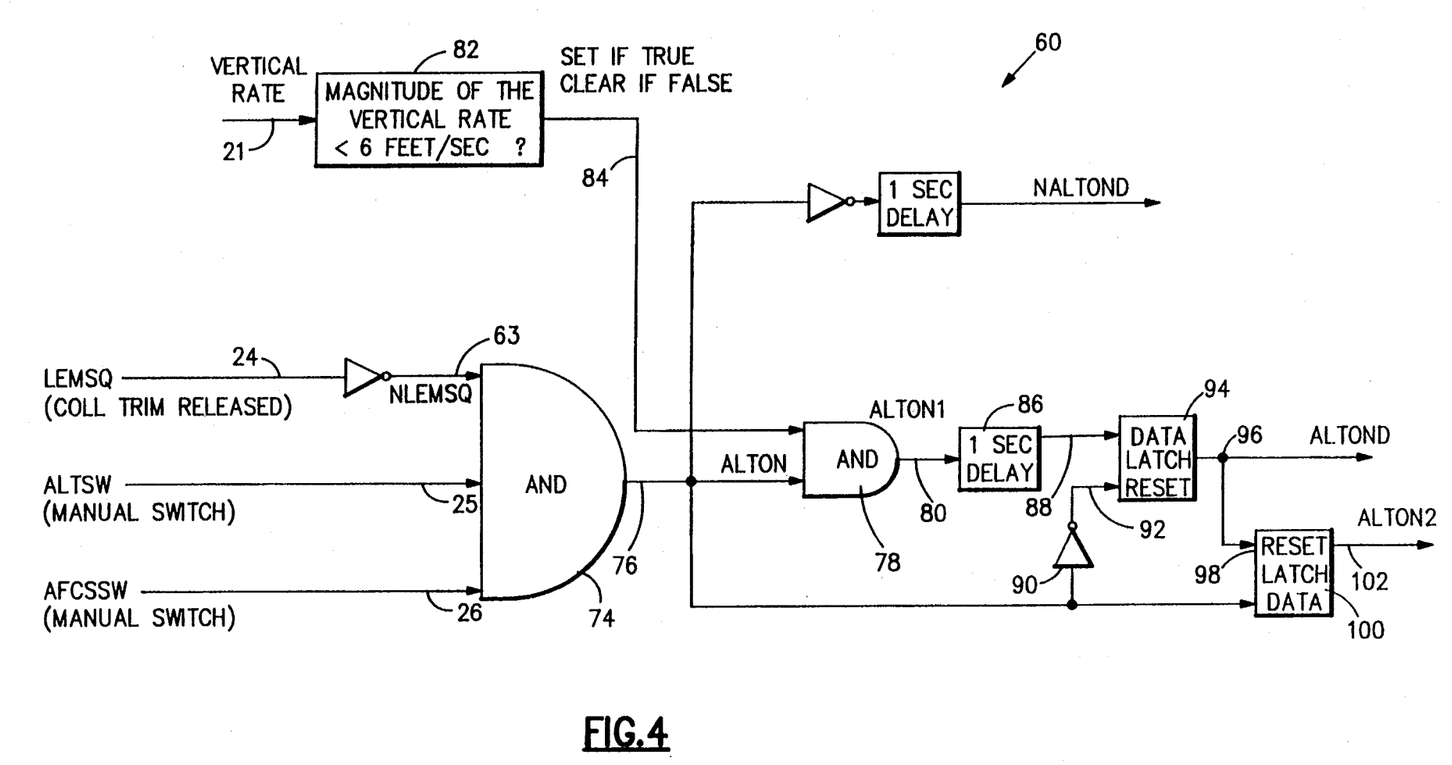
FIG. 4 is an illustration of altitude enable/disable logic within the AFCS for controlling how the vertical control system of FIG. 1 responds to commands from the AFCS.
Figure 5:
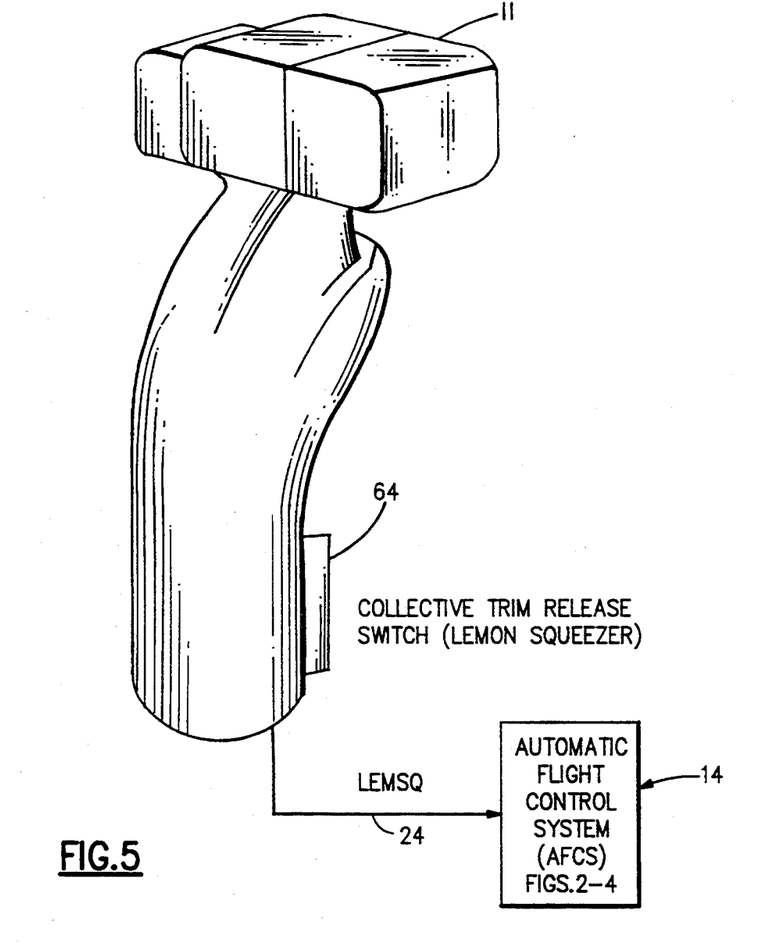
FIG. 5 is an illustration of a grip of a displacement collective stick of FIG. 1 having a collective trim release switch.

Various discrete signals are controlled by altitude hold logic 60 illustrated in FIG. 4 as a function of three discrete signals. The logic receives a discrete signal LEMSQ on a line 24, from the displacement stick 11 which is indicative of when the pilot wants the altitude hold logic to capture the position of the stick. The discrete LEMSQ is inverted to provide a signal NLEMSQ on a line 63. FIG. 5 illustrates the stick 11 in more detail and a collective trim release switch 64 (also referred to as a lemon squeezer) which is located on the stick to provide the LEMSQ discrete signal. Referring back to FIG. 4, the second discrete signal is altitude enable ALTSW which is input to the logic on the line 25, and which is set (i.e., a "1") when the altitude hold function is selected by the pilot via a switch located in the cockpit of the aircraft. The third discrete signal which is input on a line 26 is AFCS enable, AFCSSW. The AFCSSW discrete is also provided from a cockpit located pilot selectable switch, such that, AFCSSW is set when the AFCS is engaged, and cleared when the AFCS is disengaged. The three discrete signals on lines 25-26,63 are input to an AND gate 74 which determines whether altitude hold is engaged, and provides a signal ALTON on a line 76 indicative thereof. ALTON is set when the altitude hold function is engaged, and cleared when the altitude hold function is disengaged.

ALTON is input to another AND gate 78 which provides an output signal ALTON1 on a line 80 that is set, when both ALTON is set and the magnitude of the vertical rate of change is less than 6 feet/second. A test function 82 checks the vertical rate of change signal and sets a discrete signal on a line 84 when the magnitude of the rate is less than 6 feet/second. If either of the signals input to the AND gate 78 are cleared, ALTON1 will also be cleared. A one second delay function 86 delays any transitions of ALTON1 by one second before allowing the change to propagate onto an output line 88.

The ALTON signal is also inverted by an inverter 90 and input to a reset port 92 of a latch 94, such that the latch output ALTOND on a line 96 is cleared whenever, ALTON is cleared. However, if ALTON is set, the state of ALTOND is controlled by the signal on the line 88 input to the data port of the latch. In this case, if ALTOND is clear, it will be set when the data port input on the line 88 is set. ALTOND is cleared only when the reset port input is set, and is set only when both the signal on line 88 and ALTON are set.

ALTOND is input to a reset port 98 of a second latch 100 such that whenever ALTOND is set, the output of the second latch, ALTON2, on a line 102 is cleared. If ALTOND is cleared, then ALTON2 is set when ALTON is set. The operation of latches 94,102 is best summarized by a truth table:

TABLE 1

| INPUTS | | OUTPUT |
| --- | --- | --- |
| RESET | DATA | |
| 1 | x | 0 |
| 0 | 1 | 1 |
| 0 | 0 | no change | where x=don't care.

It should be understood, that in presenting the operation of the present invention, specific numbers (e.g., a one second delay) will be recited through out this specification. However, these specific numbers are only being used to illustrate one of a number of exemplary embodiments of the present invention, and thus the scope of the invention is clearly not limited to these specific numbers. Furthermore, it is contemplated that specific numbers recited herein may be varied according to the requirements of each system, and as a result all numbers recited herein are being used only by way of example, unless it is explicitly stated that a certain value is limited to operating within a certain range.

Attention is drawn to the fact that in a real time control system such as a flight control system of the present invention, delaying microprocessor functions for one second is unacceptable. Therefore, during the one second delay, the microprocessor 40 (FIG. 2) is performing other tasks well known to control system engineers until the one second has elapsed.

Referring back to FIG. 3, the lag filter 54 provides a filtered signal on a line 106 to a stick shaping map 108. The shaping map has a deadband to reduce inadvertent vertical rate commands on the line 18 that may occur when the pilot applies pitch or roll commands by pushing the sidearm controller. The stick shaping map receives the filtered signal and provides a scheduled output value on a line 110. The scheduled output value is then input to a fade function 112 whose operation is controlled by the discrete signal ALTOND on the line 96. When ALTOND transitions from cleared to set (i.e., 0 to 1) the fade function 112 fades over a short time period the signal from the shaping map 108 onto a line 114. While ALTOND remains set the signal from the shaping map is passed through the fade function 112 onto the line 114. When ALTOND transitions from set to clear (i.e., 1 to 0), the fade function fades out the signal from the shaping map such that the signal on the line 114 goes to zero.

The fade function 112 operates, in conjunction with logic to be discussed hereinafter, to enable/disable AFCS control of the main rotor pitch. That is, when altitude hold is disengaged (i.e., ALTON is cleared), the AFCS is no longer responsive to the vertical command signal from the sidearm controller on the line 18, and main rotor pitch is only controlled via the displacement stick 11.

The signal on the line 114 is input to a command model 116 which in this exemplary embodiment is a first order lag filter. The command model provides a signal on a line 118 which is the desired vertical rate of change of the aircraft. In general the characteristics of the command model are determined by the dynamics of the plant which is being controlled (e.g., rotor system dynamics).

The desired vertical rate signal is output to an inverse aircraft model 120, an integrator 122, and a summing junction 124. The inverse model represents the inverse of the aircraft dynamics, and can be modeled as a lead filter. The model provides a signal to a limit function 125 which outputs a signal on a line 126. The characteristics of the lead filter such as its gain, time constant and damping coefficient (if applicable) are selected as a function of aircraft airspeed in order to reduce the sensitivity of the control system at high airspeeds.

The integrator 122 integrates over time the desired vertical rate signal on the line 118, and provides an output signal indicative of the desired altitude of the aircraft on a line 127. The integrator includes limits to avoid the problems of integral windup in a discrete time control system, or in the case of a continuous time control system saturation of the operational amplifiers. The desired altitude signal on the line 127 is provided to a summing junction 128 which computes the error between the desired altitude and the actual aircraft altitude signal on a line 130. The error signal is output on a line 132 to a proportional plus intearal compensator 134 which provides an output signal to a line 136 on a summing junction 138.

The compensator 134 typically includes, proportional or proportional plus integral control. However, just like any control system the dynamics of the compensator has to be selected based upon the particular system to be controlled and the response requirements of that system. As an example the compensator may be a proportional plus integral plus derivative compensator (i.e., PID compensation). Compensators are well known in the art of control system design.

The signals indicative of aircraft acceleration, aircraft rate, radar altitude, and barometric altitude are all input to altitude computation logic 140 via the lines 20–23. The computation logic 140 uses the four signals to compute filtered values of actual aircraft altitude and actual aircraft altitude rate of change, and provides these two signals on lines 142,144 respectively.

The actual altitude signal on the line 142 is input to a synchronizer 146 whose operation is controlled by the discrete ALTOND. The synchronizer 146 provides the signal on the line 130. When ALTOND is clear, the synchronizer continuously stores the altitude signal currently on the line 142 and the output is zero i.e., the signal on the line is held at zero. When ALTOND transitions from clear to set, the synchronizer retains the altitude signal on the line 142 which was stored last, and provides a signal indicative of the difference between the stored altitude value and the altitude value currently being input to the synchronizer on the line 142. As an example when ALTOND is set, if the altitude signal on the line 142 represents 4,000 feet, and the value stored in the synchronizer is 3,500 feet, the signal on the line 130 will equal 500 feet. The altitude 3,500 feet was stored because it was the value on the line 142 when ALTOND transitioned from clear to set. However, when ALTOND is cleared, if the signal on the line 142 indicates 4,000 feet, the signal on the line 130 will equal zero feet, and the altitude value of 4,000 feet will be stored within the synchronizer 146.

The altitude computation logic 140 also computes the rate of altitude change, d(ALT)/dt, which is output on the line 144 into a transient free (TF) switch 146. The operation of the TF switch is controlled by the discrete signal ALTON (FIG. 4). The transient free switch 146 switches between the signal on line 144 and a grounded (zero) signal, and provides an output signal on a line 148.

The desired vertical rate signal from the command model 116 is also input to the summing junction 124 which computes the error between the desired rate of aircraft altitude change and the actual rate of altitude change. The altitude rate error signal is output on a line 150 to a gain 152 which provides a signal on a line 154 to the summing function 138. The gain 152 may be a function of airspeed to reduce the sensitivity of the altitude rate of change feedback path (144,148,150,154) at high airspeeds. The signal on line 150 also goes to a gain 204 which provides a signal on a line 206 to a switch 207 which is controlled by the discrete ALTON2 on the line 102. When ALTON2 is set, the switch 207 is closed and the signal on the 206 passes to a line 208 which applies a bias signal to the integral path (not shown) of the proportional and integral compensator 134. That is, in the integral path of the compensator 134, the signals on lines 132 and 208 are summed by a summing function which is upstream of the integrator, and a signal indicative of the sum is input to the integrator (not shown).

The summing function 138 sums the signal from the feed forward path (114,118,126), the altitude feedback path (142,130,132,136), and the altitude rate of change feedback path (144,148,150,154) to provide a signal on a line 156 to a limit function 158. The limit function provides a magnitude limited signal to a transient free (TF) switch function 160 whose operation is controlled by the discrete signal ALTON. The second input (not shown) to the TF switch 160 is tied to zero, such that the switch provides an output signal on the line 27 which smoothly transitions to/from the magnitude limited signal provided from the limit function 158 when ALTON transitions. The TF switch ensures there are no instantaneous signal changes on the line 27 when ALTON changes state.

The TF switch 160 operates in conjunction with the fade function 112 to disengage AFCS control of the main rotor pitch when altitude hold is disabled. When ALTON transitions from set (i.e., a "1") to clear (i.e., a "0"), the value on the line 27 is immediately stored within the TF switch function, and then fades to zero at a predetermined limited rate. When ALTON is set the TF switch outputs on the line 27 the present input from the limit function 158.

The command model constitutes part of the model following control laws. The principal behind the command model is that for each stick input there is a corresponding repeatable aircraft response. The control system illustrated in FIG. 3 includes two feedback paths and one feed forward path. The first feedback path is based on altitude rate of change where the altitude rate error signal on the line 150 is provided to the summing function 138 via the gain 152. The second feedback path is based on aircraft altitude and it provides the aircraft altitude error signal on the line 130. The feed forward path is provided by cascading the command model 116 and the inverse model 120 to provide the signal on the line 126. This feed forward path is commonly referred to as a model following path, since the output of the command model provides a desired rate response which is provided to the inverse model 120 resulting in a signal to drive the aircraft towards a response equal to the desired vertical rate signal on the line 118.

One important consideration embodied in the invention described herein, is the smooth transition from altitude hold disengaged to altitude hold engaged. Coupling the altitude hold logic to the collective trim release switch 64 allows the pilot to engage/disengage altitude hold without taking his hand off the collective stick. If the pilot desires to make a large altitude change using the displacement stick, he presses the trim release switch which sets LEMSQ and clears ALTON and ALTOND. The pilot can then apply a collective command via the displacement stick and climb or descend to the desired altitude. When the vehicle is near the desired altitude, the pilot releases the trim switch 64, clearing LEMSQ and setting both ALTON and ALTON2 (assuming AFCSSW and ALTSW are already set). With ALTON set, the vertical rate command on the line 154 is allowed to pass to the PFCS in order to retard any rate of climb or descent. The vertical rate error signal on the 208 is integrated by the compensator 134 to provide for a smoother transition from a climb or descent back to level flight. When the magnitude of the vertical rate decays below 6 feet/second, ALTON1 is set and ALTOND is set one second later, and ALTON2 is cleared, transitioning the aircraft back to an altitude hold mode. At this point both the altitude and altitude rate of change paths will start feeding back through the line 27. This configuration provides a smooth transition from a commanded rate of climb/descent, back to level flight (i.e., altitude hold mode) with minimal under or over shoot when the pilot uses the displacement collective to control the aircraft.

PFCS Operation

Figure 6:
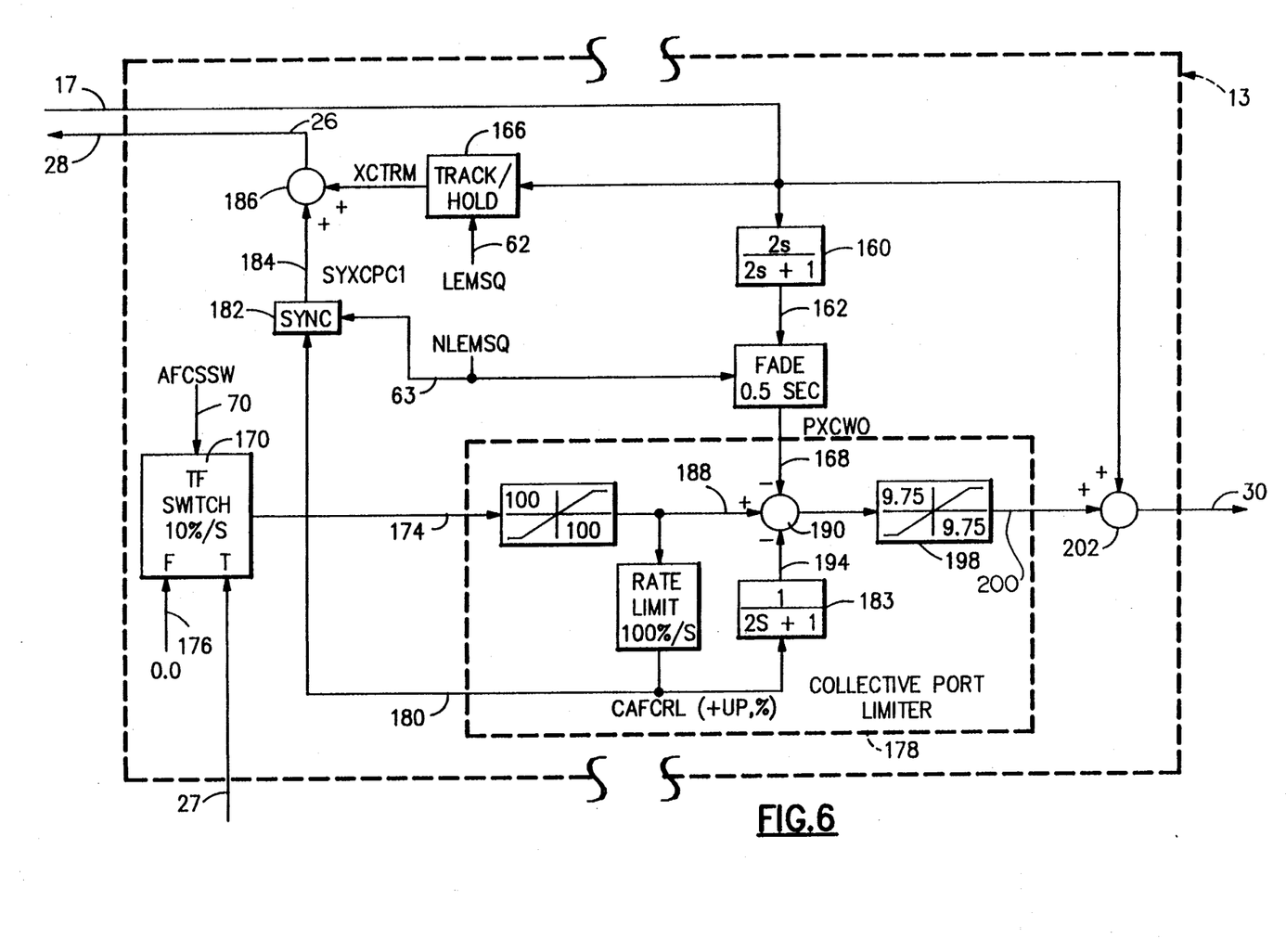
FIG. 6 is an illustration of a portion of the control logic in the PFCS of FIG. 1, which is responsive to signals from the AFCS and the collective displacement stick for providing a main rotor pitch command, and a command to position the displacement collective stick.

Referring to FIG. 6, two inputs are provided to the PFCS 13: one is the displacement collective position signal on the line 17, and the other is the collective AFCS command signal on the line 27. The displacement collective position signal is input to a derivative/lag filter (i.e., a washout filter) 160 which provides a signal on a line 162 to a fade function 164. Operation of the fade function 164 is controlled by the NLEMSQ discrete on the line 63. The fade function operates to fade its input signal in or out within a specified period of time when the NLEMSQ discrete changes state, to prevent instantaneous changes.

The displacement collective position signal is also provided to a track/hold function 166 whose operation is controlled by the LEMSQ discrete. Whenever the collective trim release switch 64 (FIG. 5) is pressed, LEMSQ is set, and the stick position on the line 17 is immediately stored within the track/hold function as the new trim position, and the output of the track/hold equals the input. When LEMSQ is cleared, the function holds the output at the last value stored. The track/hold output tracks the input when LRMSQ is set, and when LEMSQ is cleared the track/hold output is stored.

The collective AFCS command on the line 27 is input to a transient free (TF) switch 170 whose operation is controlled by the discrete signal AFCSSW on the line 70 (FIG. 5). When AFCSSW is set (i.e., a logic "1") indicating the pilot has engaged the AFCS, the switch 170 allows the signal on the line 27 to pass to an output line 174. Otherwise if AFCSSW is cleared (i.e., a logic "0"), the AFCS is disengaged and the signal on a line 176 equal to zero is passed through the switch to the output line 174.

The signal on the line 174 is input to a collective port limiter 178, where the magnitude and rate of change of the signal are limited, and a rate limited signal indicative thereof is output on a line 180. The limited signal is then input to a synchronizer 182 whose operation is controlled by the discrete NLEMSQ, such that when NLEMSQ is set the synchronizer 182 passes the error between the signal on the line 180 and the stored trim value, onto an output line 184. The synchronizer output signal is summed with the signal from the track hold function 166 by a summing function 186 to provide a servo command signal on the line 28. This summation biases the full authority command from the displacement stick 11, with the rate limited signal from the AFCS vertical control logic responsive to the sidearm controller in FIG. 3.

Assuming the cockpit mounted switches which control altitude hold and the AFCS have been enabled (i.e., the discretes AFCSSW and ALTSW are set), the pilot enables altitude hold by releasing the collective trim switch which clears LEMSQ. This allows signals on the line 168 from the AFCS to be subtracted from other signals by summing function 190.

The collective port limiter provides a rate limited signal on the line 180, which is the rate limited version of the signal on the line 188, to both a synchronizer 182 and a lag filter 183. Operation of the synchronizer 182 is controlled by the discrete NLEMSQ. The synchronizer output signal is provided on a line 184 to a summing function 186, where it is summed with the signal from the track/store 166, to provide a summed output signal on the line 28 to the displacement stick.

The AFCS command on the line 188 is also input to a summing function 190. Signals on the lines 168 (washed out collective position) and 194 (lagged, rate limited AFCS command) are subtracted from the signal on line 188 to form the error between the AFCS command and the total rate limited signal. The lag and washout filters allow the signals on lines 180 and 17 to be combined with unity gain while cancelling the high frequency dynamics associated with back driving the collective displacement stick and washing out any steady state tracking errors from this back drive control function. The output of summing function 190 is provided on line 196. This signal is authority limited by a function 198 and output on a line 200. The authority limited output of the collective port limiter on line 200 is summed with the displacement collective position on the line 17 by a summing function 202, and output on the line 30 to the mixing function 32 (FIG. 1).

It should be understood that the scope of this invention is not limited by the specific gains, lag filters, time constants, summing functions and limiting functions presented herein. Rather, it is contemplated in the practice of the present invention that the specific control laws are going to change based upon the dynamics of the plant to be controlled (e.g., an attack helicopter versus a commercial helicopter), and the peculiarities associated with each plant. As an example, the inverse model may be greater than first order. In addition it is not necessary that the flight control system be partitioned into a PFCS and an AFCS. Rather it is contemplated that the system may not be partitioned at all in some applications, whereas in other applications the system may be further partitioned into subsystems based on criteria such as reliability and maintainability.

Furthermore, while it is obvious it still is worth stating that the present invention is clearly not limited to a microprocessor based control system. The system may be implemented in a non-microprocessor based electronic system (either digital or analog).

All the foregoing changes and variations are irrelevant to the invention, it suffices a vertical control system for a rotary winged aircraft receives inputs from a displacement collective stick and a multi-axis sidearm controller, and schedules via an aircraft command model a set point for the vertical rate of change of the aircraft as a function of a vertical command signal from the sidearm controller. The set point is used as a reference for an altitude rate of change feedback path, and an integrated value of the set point is used for an altitude feedback path, and the set point is also input to a feedforward control path having an inverse vehicle model to provide a command signal indicative of the command for aircraft collective pitch necessary to achieve the desired set point. Signals from all three paths are summed to provide a magnitude and rate limited command signal which controls aircraft altitude rate of change when the aircraft altitude hold function is engaged by the pilot.

The present invention commands aircraft vertical rate of change in response to force imparted by the pilot in the vertical axis of the sidearm controller, and conditions/shapes the resultant limited authority rate command signal such that the pilot may smoothly transition between using the full time full authority displacement collective stick to control aircraft vertical lift, and the sidearm controller. When the pilot has engaged altitude hold, he can control vertical aircraft rate of change by applying the appropriate force on the sidearm controller, and the displacement collective stick will "track" the force.

Although the present invention has been shown and described with respect to a best mode embodiment thereof, it should be understood by those skilled in the art that various other changes, omissions and additions to the form and detail of the thereof, may be made therein departing from the spirit and scope of the invention.

We claim:

1. A vertical control system for a rotary winged aircraft which receives signals indicative of aircraft vertical acceleration, aircraft vertical rate, and aircraft altitude from various sensors on the aircraft, for controlling the collective pitch of main rotor blades of the aircraft, comprising:

a four axis sidearm controller which provides a first signal indicative of desired lift;

a collective stick;

means for sensing the position of said collective stick, and for providing a position signal indicative thereof;

means for driving said collective stick in response to said position signal and changing values of said first signal;

means responsive to said first signal for providing a desired aircraft vertical rate of change command signal; and means responsive to said desired aircraft vertical rate of change command signal, for computing an altitude rate error signal which is the difference between the rate of change indicated by said desired aircraft vertical rate of change command signal and the actual aircraft vertical rate of change, for integrating said desired aircraft vertical rate of change command signal to provide a desired altitude command signal, for calculating an altitude error signal which is the difference between the altitude indicated by said desired altitude command signal and the actual aircraft altitude, for computing a feedforward command signal in response to said desired aircraft vertical rate of change signal, and for summing said altitude rate error signal with said altitude error signal and said feedforward command signal to provide a rotor command signal indicative of the collective pitch necessary to drive the actual aircraft altitude rate of change toward the rate indicated by said desired aircraft vertical rate of change signal.

2. The system of claim 1 further comprising:
means for summing said position signal and said rotor command signal to provide a collective pitch command signal.

3. The system of claim 1, further comprising:
means for limiting the time rate of change of said rotor command signal, for limiting the magnitude of said rotor command signal, and for providing a limited rotor command signal indicative thereof; and
means for summing said position signal and said limited rotor command signal to provide a collective pitch command signal.

4. A flight control system for a helicopter having: sensors which provide signals indicative of the helicopter's actual altitude and actual altitude rate of change, a sidearm controller which provides a vertical lift command signal indicative of the desired lift along the vertical axis, and a collective stick which provides a collective command signal indicative of desired collective pitch; the flight control system controls vertical lift of the helicopter by providing to the helicopter's main rotor a set point signal indicative of the desired collective pitch of the helicopter's main rotor blades, the flight control system comprising:

means for providing, for each value of the vertical lift command signal presented thereto, a vertical rate of change command signal indicative of a corresponding desired value for the helicopter's vertical rate of change;

means for integrating said vertical rate of change command signal to provide a desired altitude command signal;

first means of computing a first difference value between the value of said desired altitude command signal and the value of said helicopter's actual altitude signal, and for providing an altitude error signal indicative of said first difference value;

second means for computing a second difference value between the value of said vertical rate of change command signal and the value of said helicopter's actual altitude rate of change signal, and for providing an altitude rate of change error signal indicative of said second difference value;

inverse model means for providing for each value of said vertical rate of change command signal, a feedforward collective set point signal indicative of the collective pitch required for the helicopter to aerodynamically respond along its vertical axis at a rate set by the value of said vertical rate of change command signal;

means for summing said altitude error signal, said altitude rate of change error signal, and said feedforward collective set point signal, and for providing as a summation thereof a modifying collective pitch command signal;

means for summing said collective command signal with said modifying collective pitch command signal to provide, as the sum thereof, said desired collective pitch set point signal; and output means for providing said desired collective pitch set point signal value to the helicopter's main rotor, such that by commanding the collective pitch of helicopter's main rotor blades in response to said desired collective pitch set point signal, the helicopter will aerodynamically respond along its vertical axis in a manner to cause the values of said altitude error signal and said altitude rate error signal to approach zero.

5. The flight control system of claim 4, wherein:
said means for providing includes a first order lag filter which is responsive to each value of the vertical lift command signal; and
said inverse model means includes a first order lead filter responsive to each of said desired values of vertical rate of change signal.

6. The flight control system of claim 4, further comprising:
means for magnitude and rate limiting said modifying collective pitch command signal values to provide a limited signal indicative thereof; and
means for moving the collective stick in response to the value of said limited signal such that the collective stick position commands the collective pitch of the main rotor blades.

7. The flight control system of claim 4, further comprising means for fading in and out said command modifying signal to/from said second means for summing, such that the collective pitch of the helicopter's main rotor blades is controlled exclusively in response to values of the collective command signal when said command modifying signal is faded out, and when faded in said command modifying signal is a bias to the collective command signal.

8. The flight control system of claim 7, further comprising:
means for tracking the collective command signal value by providing a signal value which is equal to the value of the collective command signal when a first discrete signal is true, and for storing the collective command signal value when said first discrete signal is false;
means for magnitude and rate limiting said modifying collective pitch command signal values to provide a limited signal indicative thereof;
synchronizing means, for storing each value of said limited signal when said first discrete signal is false, for providing a synchronizer output signal equal to zero when said first signal is false, and for providing said synchronizer output signal at a value which is equal to the present value of said limited signal and the stored value of limited signal; and motive means for moving the collective stick in response to the value of said synchronizer output signal such that the collective stick position commands the collective pitch of the main rotor blades.

9. The flight control system of claim 8, wherein said inverse model means includes a lead filter of at least first order which provides said feedforward collective set point signal value.

10. A helicopter flight control system which receives signals indicative of: the helicopter's actual altitude and actual altitude rate of change, a vertical lift command signal indicative of desired vertical lift along the helicopter's vertical axis, and a collective command signal indicative of main rotor collective pitch; the flight control system controls vertical lift of the helicopter by providing to the helicopter's main rotor a set point signal indicative of the desired collective pitch of the helicopter's main rotor blades, the flight control system comprising:

means for providing, for each value of said vertical lift command signal presented thereto, a corresponding desired vertical rate of change command signal;

means for integrating said desired vertical rate of change command signal to provide a desired altitude command signal;

first means, for computing a first difference value between the value of said desired altitude command signal and the value of said helicopter's actual altitude signal, and for providing an altitude error signal indicative of said first difference value;

second means for computing a second difference value between the value of said desired vertical rate of change command signal and the value of said helicopter's actual altitude rate of change signal, and for providing an altitude rate of change error signal indicative of said second difference value;

inverse model means for providing for each value of said desired vertical rate of change command signal, a feedforward collective set point signal indicative of the collective pitch required for the helicopter to aerodynamically respond along its vertical axis in a manner set by the value of said desired vertical rate of change command signal;

means for summing said altitude error signal, said altitude rate of change error signal, and said feedforward collective set point signal, and for providing as a summation thereof a modifying collective pitch command signal;

means for summing said collective command signal with said modifying collective pitch command signal to provide as the sum thereof said desired collective pitch set point signal; and output means, for presenting said desired collective pitch set point signal to the helicopter's main rotor to set the collective pitch of helicopter's main rotor blades in response to the value of said desired collective pitch set point signal so the helicopter aerodynamically responds along its vertical axis in a manner to cause the values of said altitude error signal and said altitude rate error signal to approach zero.

11. The flight control system of claim 10, wherein:

said means for providing includes a first order lag filter which is responsive to each value of the vertical lift command signal; and said inverse model means includes a first order lead filter responsive to each of said desired values of vertical rate of change signal.

12. The flight control system of claim 11, further comprising means for fading in and out said command modifying signal to/from said second means for summing, such that the collective pitch of the helicopter's main rotor blades is controlled exclusively in response to values of the collective command signal when said command modifying signal is faded out, and when faded in said command modifying signal is a bias to the collective command signal.

13. The flight control system of claim 12, further comprising:

means for tracking the collective command signal value by providing a signal value which is equal to the value of the collective command signal when a first discrete signal is true, and for storing the collective command signal value when said first discrete signal is false; and means for magnitude and rate limiting said modifying collective pitch command signal values to provide a limited signal indicative thereof;

synchronizing means for storing each value of said limited signal when said first discrete signal is false, for providing a synchronizer output signal equal to zero when said first signal is false, and for providing said synchronizer output signal at a value which is equal to the present value of said limited signal and the stored value of limited signal; and motive means for moving the collective stick in response to the value of said synchronizer output signal such that the collective stick position commands the collective pitch of the main rotor blades.

14. The flight control system of claim 13, wherein said inverse model means includes a lead filter of at least first order which provides said feedforward collective set point signal value; and said means for providing includes a lag filter which provides said desired vertical rate of change signal value.

* * * * *